US010926608B2

(12) United States Patent
Hosokawa et al.

(10) Patent No.: US 10,926,608 B2
(45) Date of Patent: Feb. 23, 2021

(54) REFRIGERANT CONTAINER (71) Applicant: Fujikoki Corporation, Tokyo (JP)

(72) Inventors: Kouji Hosokawa, Tokyo (JP);
Takeharu Ozawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 124 days.

(21) Appl. No.: 16/314,181

(22) PCT Filed: Oct. 17, 2017

(86) PCT No.: PCT/JP2017/037448
§ 371 (c)(1),
(2) Date: Dec. 28, 2018

(87) PCT Pub. No.: WO2018/123215
PCT Pub. Date: Jul. 5, 2018

(65) Prior Publication Data
US 2019/0225055 A1 Jul. 25, 2019

(30) Foreign Application Priority Data

Dec. 27, 2016 (JP) .............................. JP2016-252839

(51) Int. Cl.
B60H 1/32 (2006.01)
F25B 43/00 (2006.01)
(52) U.S. Cl.
CPC ............. B60H 1/32 (2013.01); F25B 43/00 (2013.01); F25B 43/003 (2013.01); B60H 2001/3286 (2013.01)

(58) Field of Classification Search
CPC .... F25B 33/00; F25B 2400/23; F25B 43/006; B60H 1/32; B60H 2001/3286
See application file for complete search history.

(56) References Cited

U.S. PATENT DOCUMENTS 5,799,499 A * 9/1998 Yano ..................... F25B 41/062
62/225
5,996,360 A 12/1999 Tanaka et al.
(Continued)

FOREIGN PATENT DOCUMENTS

JP 2-169970 A 6/1990
JP 11-159920 A 6/1999
(Continued)

Primary Examiner — David J Teitelbaum
(74) Attorney, Agent, or Firm — Lucas & Mercanti, LLP (57) ABSTRACT Provided is a refrigerant container having a rational structure with a small number of components, the container having both the functions of a receiver and an accumulator. Specifically, the refrigerant container includes a tank 10 capable of temporarily storing a refrigerant; and a gas/liquid inlet port 15, a liquid-phase outlet port 16, and a gas-phase outlet port 17 that are provided in an upper portion of the tank 10. The refrigerant container 1 is adapted to separate a refrigerant introduced through the gas/liquid inlet port 15 into a liquid-phase refrigerant and a gas-phase refrigerant, and has the function of a receiver that guides only the liquid-phase refrigerant after the separation to the side of an expansion valve via the liquid-phase outlet port 16, and the function of an accumulator that guides the gas-phase refrigerant after the separation to the suction side of a compressor via the gas-phase outlet port 17 together with oil contained in the liquid-phase refrigerant.

5 Claims, 10 Drawing Sheets (56) References Cited

U.S. PATENT DOCUMENTS

| | | | | |
|---|---|---|---|---|
| 6,523,365 B2 * | 2/2003 | Zhang | ................. | F25B 40/00 |
| | | | | 62/503 |
| 2006/0075763 A1 * | 4/2006 | Park | ................. | G05D 9/12 |
| | | | | 62/149 |

FOREIGN PATENT DOCUMENTS

| JP | 2012-093051 A | 5/2012 |
| JP | 2012-136147 | 7/2012 |
| JP | 2013-184596 A | 9/2013 |
| WO | 2013/190769 A1 | 12/2013 |

\* cited by examiner

Bottom View

Fig. 6D

Base Plate

REFRIGERANT CONTAINER

CROSS-REFERENCE TO RELATED APPLICATIONS

This application is a 371 of PCT/JP2017/037448, filed Oct. 17, 2017, which claims benefit of Japanese Patent Application No. 2016-252839, filed on Dec. 27, 2016.

TECHNICAL FIELD

The present invention relates to refrigerant containers for use in the heat pump refrigeration cycles of car air-conditioners and the like (hereinafter referred to as heat pump systems). In particular, the invention relates to a refrigerant container that is adapted to separate a refrigerant into a liquid-phase refrigerant and a gas-phase refrigerant and has both the function of a receiver that guides only the liquid-phase refrigerant after the separation to the side of an expansion valve, and the function of an accumulator that guides the gas-phase refrigerant (plus oil) after the separation to the suction side of a compressor.

BACKGROUND ART

As a heat pump system forming a car air-conditioner or the like, as described in Patent Literature 1, for example, there is known a system that includes, in addition to a compressor, a condenser, an evaporator, an expansion valve, a flow channel switching valve, an on-off valve, and the like, a receiver adapted to perform gas-liquid separation for guiding only a liquid-phase refrigerant after the separation to the expansion valve, and an accumulator adapted to perform gas-liquid separation for guiding a gas-phase refrigerant (including oil) after the separation to the suction side of the compressor.

In such a heat pump system with a receiver and an accumulator, a reduction in the space occupied by the entire system as well as a reduction in the number of components is demanded.

CITATION LIST

Patent Literature

[Patent Literature 1] JP 2013-184596 A
[Patent Literature 2] JP 2012-136147 A

SUMMARY OF INVENTION

Technical Problem

As a measure to meet the aforementioned demand, it is considered to be effective to, as described in Patent Literature 2 (or FIG. 16 thereof), for example, allow a single tank (i.e., a container) to separate a refrigerant therein into a liquid-phase refrigerant and a gas-phase refrigerant, and to have the function of a receiver that guides only the liquid-phase refrigerant after the separation to the side of an expansion valve, and the function of an accumulator that guides the gas-phase refrigerant after the separation to a suction side of a compressor.

However, Patent Literature 2 only describes that a single container functions as a receiver and an accumulator, and does not at all disclose the internal structure of the container or the like.

The present invention has been made in view of the foregoing, and it is an object of the present invention to provide a refrigerant container having a rational structure with a small number of components, the container having both the functions of a receiver and an accumulator.

Solution to Problem

In order to solve the aforementioned object, a refrigerant container in accordance with the present invention basically includes a tank capable of temporarily storing a refrigerant; and a gas/liquid inlet port, a liquid-phase outlet port, and a gas-phase outlet port that are provided in an upper portion of the tank. The refrigerant container is adapted to separate a refrigerant introduced through the gas/liquid inlet port into a liquid-phase refrigerant and a gas-phase refrigerant, and has the function of a receiver that guides only the liquid-phase refrigerant after the separation to the side of an expansion valve via the liquid-phase outlet port, and the function of an accumulator that guides the gas-phase refrigerant after the separation to a suction side of a compressor via the gas-phase outlet port together with oil contained in the liquid-phase refrigerant.

In a preferred aspect, an upper-face opening of the tank is hermetically closed by a cap member that includes the gas/liquid inlet port, the liquid-phase outlet port, and the gas-phase outlet port therein; a gas-liquid separator is disposed below the cap member in the tank, the gas-liquid separator having the shape of a conical hat or an inverted wide bowl and having a smaller diameter than the inside diameter of the tank; a gas/liquid outlet pipe is disposed between the cap member and the bottom of the tank, the gas/liquid outlet pipe being segmented into a downward-feed flow channel portion, an upward-feed inner pipe portion, and a liquid-phase inner pipe portion; and a strainer is provided at the lower end of the gas/liquid outlet pipe. Specifically, the downward-feed flow channel portion is open at its upper end to the lower portion of the gas-liquid separator and is adapted to guide the gas-phase refrigerant in the upper portion of the tank to a portion around the bottom of the tank; the upward-feed inner pipe portion protrudes upward at its upper portion beyond the upper end of the downward-feed flow channel portion and is adapted to guide the gas-phase refrigerant from the downward-feed flow channel portion to the gas-phase outlet port; and the liquid-phase inner pipe portion is adapted to guide the liquid-phase refrigerant around the bottom of the tank to the liquid-phase outlet port.

In a further preferred aspect, the gas-liquid separator is sandwiched between the cap member and the gas/liquid outlet pipe.

In still another preferred aspect, an on-off valve, which is adapted to open or close a flow channel for guiding the gas-phase refrigerant in a portion that functions as the accumulator, is provided.

In a further preferred aspect, the on-off valve is disposed above the tank.

In a further preferred aspect, the on-off valve is an electromagnetic valve.

Advantageous Effects of Invention

The refrigerant container in accordance with the present invention has both the functions of a receiver and an accumulator, and the receiver and the accumulator can share the tank portion, the inlet port portion, the gas-liquid separator portion, the outlet pipe portion, the strainer portion, and the like in common. Therefore, a rational structure with a small number of components can be provided, and thus, in a heat pump system that adopts such a refrigerant container, a reduction in the space occupied by the entire system as well as a reduction in the number of components is achieved, so that a reduction in the cost and size can be effectively achieved.

In addition, since the refrigerant container is provided with an on-off valve so as to be able to switch between a state in which the container functions as a receiver and a state in which the container functions as an accumulator in accordance with the operating state of the system based on opening/closing (i.e., ON or OFF) of the on-off valve, the pipe lines and the like of the system can be simplified in comparison with when the on-off valve is provided outside of the container.

DESCRIPTION OF EMBODIMENTS

Hereinafter, embodiments of the present invention will be described with reference to the accompanying drawings.

Figure 1:
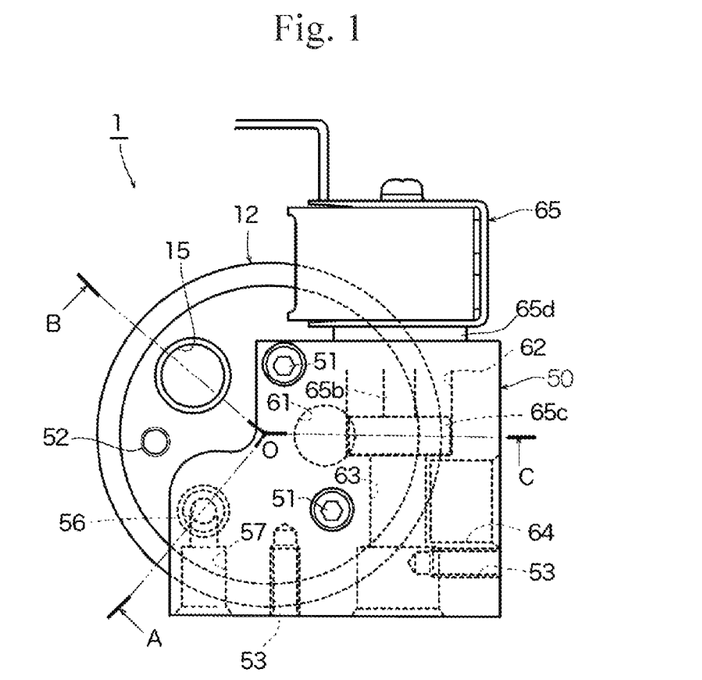
FIG. 1 is a top view of an embodiment of a refrigerant container in accordance with the present invention.
Figure 2:
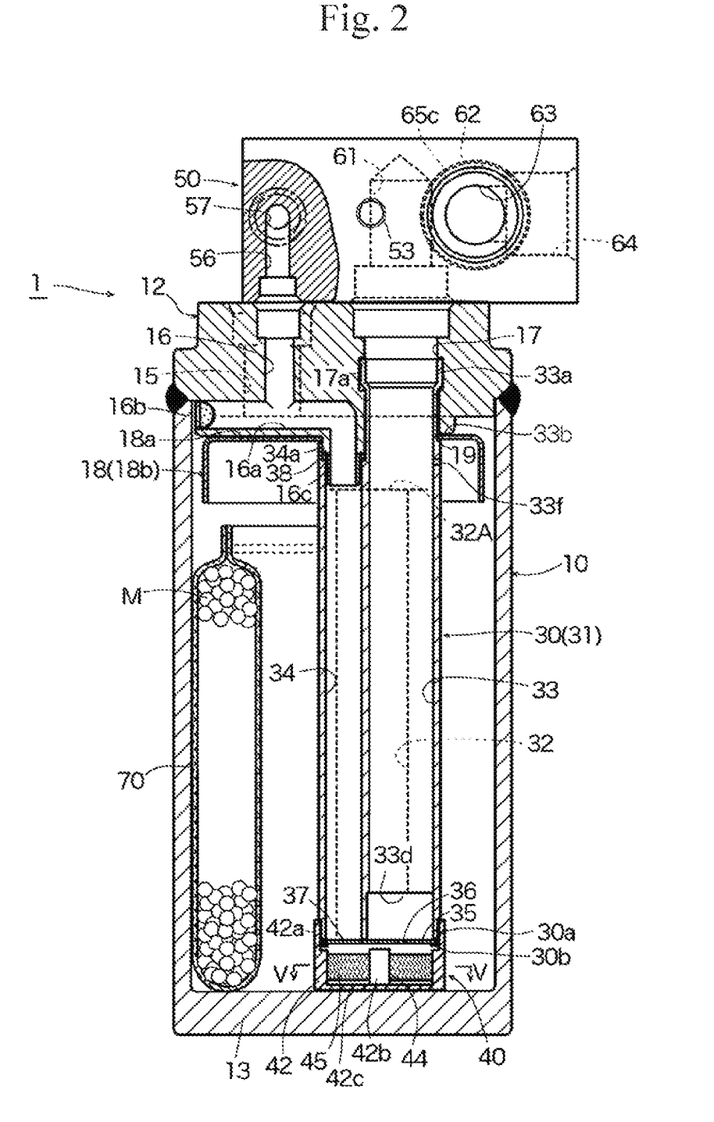
FIG. 2 is a partially cutaway longitudinal cross-sectional view taken in the direction of arrows A-C passing through O in FIG. 1.
Figure 3:
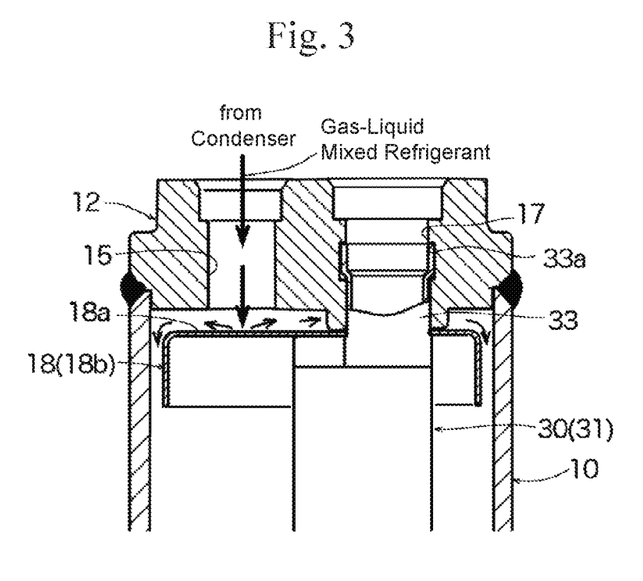
FIG. 3 is a partially cutaway cross-sectional view taken in the direction of arrows B-C passing through O in FIG. 1.

FIG. 1 is a top view of an embodiment of a refrigerant container in accordance with the present invention. FIG. 2 is a partially cutaway longitudinal cross-sectional view taken in the direction of arrows A-C passing through O in FIG. 1. FIG. 3 is a partially cutaway cross-sectional view taken in the direction of arrows B-C passing through O in FIG. 1.

A refrigerant container 1 of an embodiment illustrated in the drawings is used for a heat pump system forming a car air-conditioner for an electric vehicle, for example. The refrigerant container 1 includes a cylindrical tank 10 having a bottom and made of metal, such as stainless steel or aluminum alloy, and an upper-face opening of the tank 10 is hermetically closed by a cap member 12 made of the same metal. It should be noted that the refrigerant container 1 of this embodiment is placed in a vertical position as illustrated in the drawings, for example. That is, the refrigerant container 1 is placed with the cap member 12 located on the upper side and the bottom 13 of the tank 10 located on the lower side.

The cap member 12 includes a gas/liquid inlet port 15 and a gas-phase outlet port 17 with a stepped large diameter, which are arranged side by side in the cap member 12 while penetrating through the cap member 12 such that they are open on the top and bottom sides thereof, and also includes a liquid-phase outlet port 16 with a relatively small diameter. The liquid-phase outlet port 16 has at its lower portion an L-shaped passage portion 16a lying on its side and having an opening at one end (i.e., the lower end) thereof. The other end (i.e., an opening at the other end facing a lateral side) of the passage portion 16a is closed by a plug 16b.

A connection adapter 50, which has a partially cutaway rectangular shape in plan view (i.e., a portion covering the gas/liquid inlet port 15 is cut away) and has a rectangular shape in front view, is hermetically attached to the upper side of the cap member 12 with bolts 51 and the like such that it covers a portion excluding the gas/liquid inlet port 15 of the cap member 12. The connection adapter 50 functions as a valve body of an on-off valve 65 described below. It should be noted that the cap member 12 is provided with an internal thread 52 for screwing a flange portion of an inlet conduit therein, and the connection adapter 50 is provided with internal threads 53, 53 for screwing the flange portion of the inlet conduit and a flange portion of an outlet conduit described below therein (the internal structure of the connection adapter 50 is described in detail below).

A gas-liquid separator 18 in the shape of a conical hat or an inverted wide bowl having a slightly smaller diameter than the inside diameter of the tank 10 is disposed below the cap member 12 such that the upper face of the gas-liquid separator 18 partially abuts the lower face of the cap member 12.

In addition, the upper end of the gas/liquid outlet pipe 30 is connected to the lower portion of the gas-phase outlet port 17 of the cap member 12.

Specifically, the gas/liquid outlet pipe 30 is produced through extrusion molding using aluminum alloy or the like as a material, for example, and as is clearly seen in FIGS. 5 and 6A to 6D, which illustrate a state before the gas/liquid outlet pipe 30 is attached to the tank 10, in addition to FIG. 2, the gas/liquid outlet pipe 30 has an outer pipe portion 31 whose outer shape has a circular cross-section. The inside of the outer pipe portion 31 is segmented into a pair of right and left (front and back in the drawing) downward-feed flow channel portions 32, 32, each of which is open at its upper end to the lower side of the gas-liquid separator 18 and has the shape of a wing in plan view, for guiding a gas-phase refrigerant in the upper portion of the tank 10 to a portion around the bottom 13 of the tank 10; an upward-feed inner pipe portion 33 having a relatively large diameter and protruding upward at its upper portion beyond the upper ends of the downward-feed flow channel portions 32, 32, for guiding a gas-phase refrigerant from the downward-feed flow channel portions 32, 32 to the gas-phase outlet port 17; and a liquid-phase inner pipe portion 34 having a relatively small diameter for guiding a liquid-phase refrigerant around the bottom 13 of the tank 10 to the liquid-phase outlet port 16.

Figure 5:
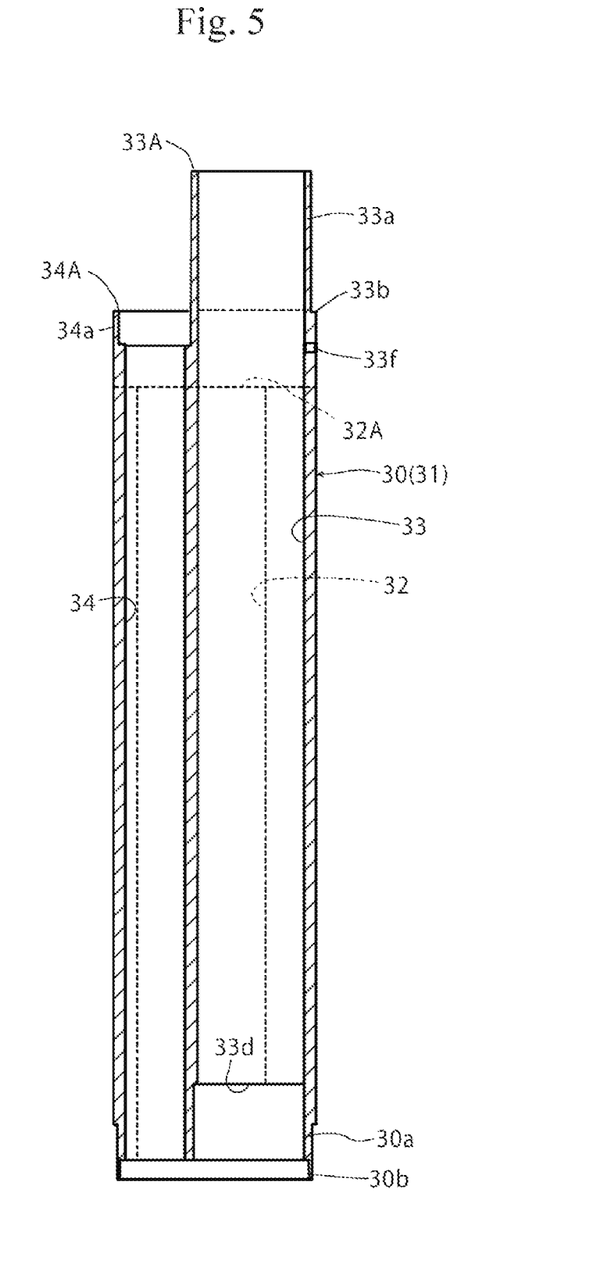
FIG. 5 is a longitudinal cross-sectional view illustrating a state before a gas/liquid outlet pipe illustrated in FIG. 2 is attached to a tank.

It should be noted that the height positions of upper end faces 32A, 33A, 34A of the downward-feed flow channel portions 32, 32, the upward-feed inner pipe portion 33, and the liquid-phase inner pipe portion 34 satisfy the following relationship: the upward-feed inner pipe portion 33 (highest) >the liquid-phase inner pipe portion 34 (second highest)>the downward-feed flow channel portions 32 (lowest). In addition, a pressure equalizing hole 33f is provided in the upward-feed inner pipe portion 33 at a height around the gas-liquid separator 18 so as to prevent a backflow of a liquid to the compressor side when the operation of the system is stopped (ON→OFF).

An upper end 33a of the upward-feed inner pipe portion 33 of the gas/liquid outlet pipe 30 is thin, and the thin upper end 33a is passed through a through-hole 19 provided in the gas-liquid separator 18 and through the lower portion of the gas-phase outlet port 17, and then, the upper portion of the thin upper end 33a is fixed in an annular recess portion 17a formed in the intermediate portion of the gas-phase outlet port 17 such that the diameter of the upper portion is widened. Accordingly, the gas-liquid separator 18 is locked by being sandwiched between a step portion 33b provided at the lower end of the thin upper end 33a (and the upper end of the liquid-phase inner pipe portion 34) and the lower end face of the cap member 12, and also, the gas/liquid outlet pipe 30 is securely held by the cap member 12.

Meanwhile, the lowermost end of the gas/liquid outlet pipe 30 is a thin portion 30b for swaging to which a base plate 35 is adapted to be fixed through swaging, and a lower-end thin portion 30a, which is slightly thicker than the thin portion 30b for swaging and is adapted to be securely fitted into an upper portion 42a with a stepped inner periphery of a case 42 of a strainer 40 (which is described below) through press fitting or the like, is provided above the thin portion 30b for swaging. It should be noted that the lower end of a partition wall, which separates the upward-feed inner pipe portion 33 from the pair of right and left (front and back in the drawing) downward-feed flow channel portions 32, 32, has formed therein a cutout opening 33d that allows the upward-feed inner pipe portion 33 and the downward-feed flow channel portions 32, 32 to communicate with each other.

Figure 6A:
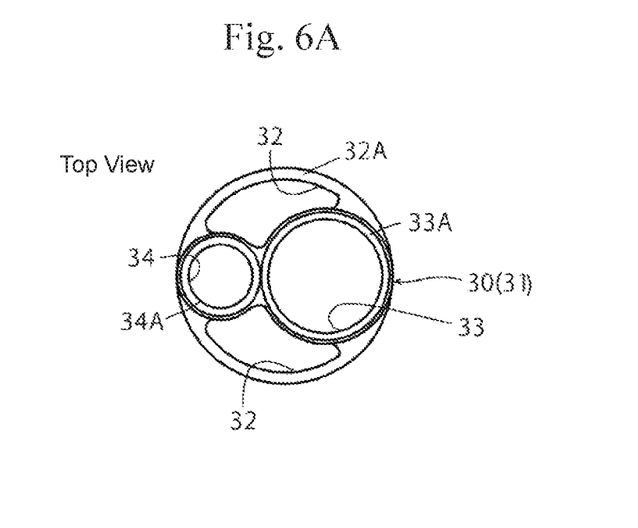
FIG. 6A is a top view of the gas/liquid outlet pipe illustrated in FIG. 5.
Figure 6B:
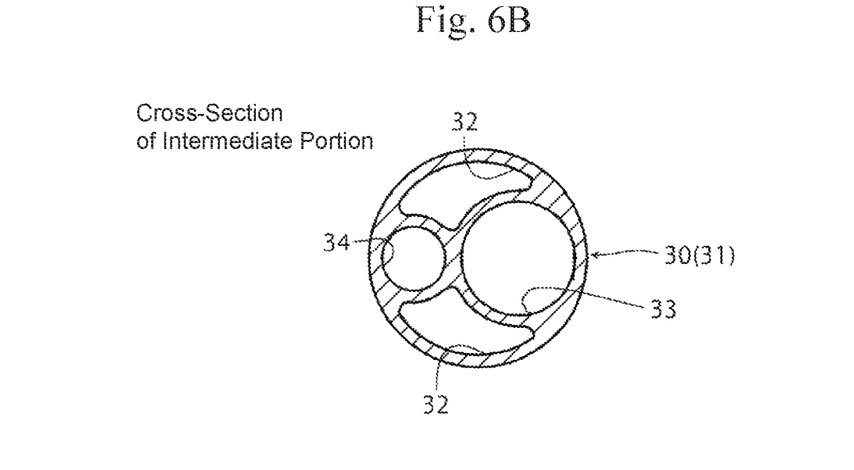
FIG. 6B is a horizontal cross-sectional view of an intermediate portion of the gas/liquid outlet pipe illustrated in FIG. 5.
Figure 6C:
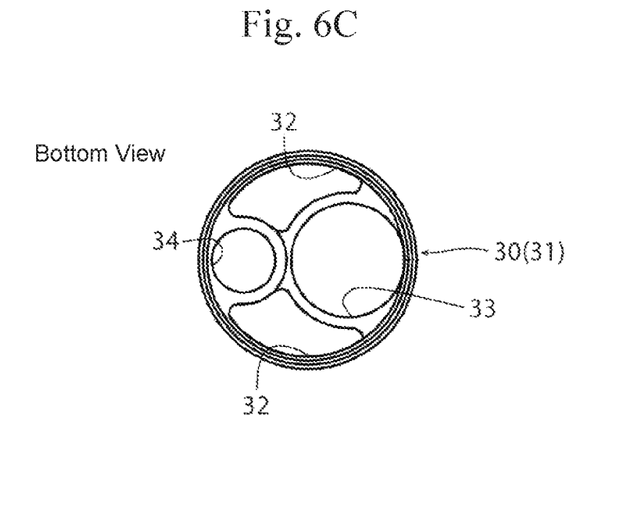
FIG. 6C is a bottom view of the gas/liquid outlet pipe illustrated in FIG. 5.
Figure 6D:
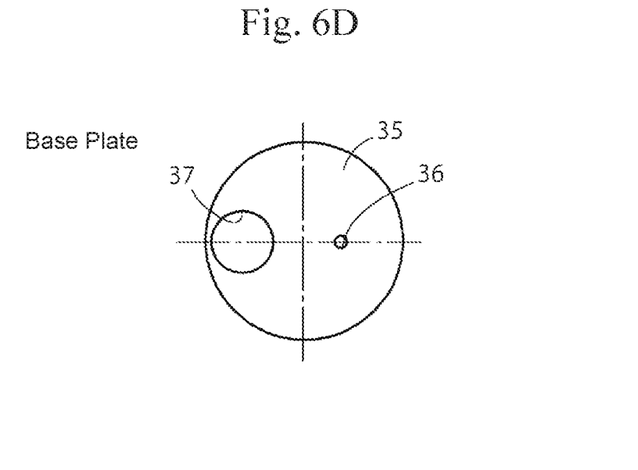
FIG. 6D is a plan view of a base plate securely attached to the lower end of the gas/liquid outlet pipe illustrated in FIG. 5.

An oil return hole 36 is provided in the base plate 35 fixed to the lower end (i.e., the thin portion 30b for swaging) of the gas/liquid outlet pipe 30 through swaging, at a position along the center line of the upward-feed inner pipe portion 33 or a region on the inner side of the upward-feed inner pipe portion 33. In addition, a liquid suction port 37 with substantially the same diameter as that of the liquid-phase inner pipe portion 34 is provided in a portion of the base plate 35 facing the liquid-phase inner pipe portion 34. The diameter of the oil return hole 36 is set to about 1 mm, for example.

The upper end of the liquid-phase inner pipe portion 34 is provided with a thin external fitting portion 34a, and the lower end of the passage portion 16a of the liquid-phase outlet port 16 of the cap member 12 is provided with a thin internal fitting portion 16c. The thin external fitting portion 34a and the thin internal fitting portion 16c are fitted together, and an O-ring 38 is inserted between the lower-end step portion of the thin external fitting portion 34a and the upper-end step portion of the thin internal fitting portion 16c. Accordingly, the liquid-phase inner pipe portion 34 and the liquid-phase outlet port 16 are hermetically connected together.

The gas-liquid separator 18 is made of metal such as stainless steel or aluminum alloy, and is disposed at a position lower than the lower end face of the cap member 12 (or the gas/liquid inlet port 15 therein) by a predetermined distance so as to cover the upper-end openings of the downward-feed flow channel portions 32 of the gas/liquid outlet pipe 30. The gas-liquid separator 18 is provided with the through-hole 19 through which the upward-feed inner pipe portion 33 of the gas/liquid outlet pipe 30 and the lower side portion of the passage portion 16a of the liquid-phase outlet port 16 pass, and has a disk-shaped ceiling portion 18a at a position higher than the upper-end openings of the downward-feed flow channel portions 32 by a predetermined distance so as to be opposite the upper-end openings of the downward-feed flow channel portions 32, and a cylindrical peripheral wall portion 18b that is continuous with the outer periphery of the ceiling portion 18a and faces downward.

Meanwhile, the strainer 40 is provided at the lower end of the gas/liquid outlet pipe 30.

Figure 4:
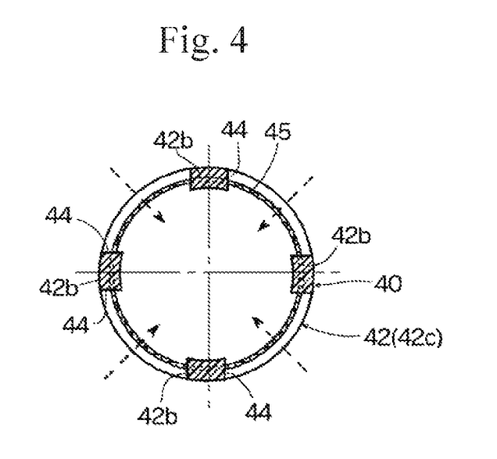
FIG. 4 is a cross-sectional view taken in the direction of arrows V-V in FIG. 2.

Specifically, the strainer 40 is fixed by being placed on the bottom 13 of the tank 10, and includes, as is clearly seen in FIG. 4, a cylindrical case 42 having a bottom and made of synthetic resin, and a cylindrical mesh filter 45 integrally formed with the case 42 trough insert molding or the like. The mesh filter 45 is made of a metallic mesh or a mesh material of synthetic resin, for example.

The case 42 of the strainer 40 includes an upper portion 42a with a stepped inner periphery in which the lower end of the gas/liquid outlet pipe 30 is adapted to be securely fitted, a base plate portion 42c, and four columnar portions 42b that are disposed in upright position on the outer periphery of the base plate portion 42c at equal angular intervals and connect to the upper portion 42a. The outer periphery of the base plate portion 42c is provided with an annular connecting band portion, and the upper and lower ends of the mesh filter 45 are secured to the connecting band portion and the lower side of the upper portion 42a. That is, four windows 44 that are rectangular in side view are defined between the four columnar portions 42b, and the mesh filter 45 is put in the portion of each window 44 in a tensed manner. It should be noted that the mesh filter 45 may be integrally formed with the case 42 through insert molding during molding of the case 42. In addition, although the four columnar portions 42b are provided with slops for demolding, the widths of the four columnar portions 42b in the radial direction are set substantially equal. Further, the method for providing the mesh filter 45 on the case 42 is not limited to the method described above.

A bag 70 with a predetermined height, which contains desiccants M therein, is disposed in the tank 10 by being placed on the bottom 13 of the tank 10 along the inner periphery of the tank 10 so that moisture in the refrigerant is absorbed and removed by the desiccants M. The bag 70 is made of a fabric such as felt with a ventilation property, a water permeation property, and a desired shape retention property, and is filled with granular desiccants M almost entirely.

A left end on the front side of the connection adapter 50 attached to the cap member 12 of the tank 10 with the aforementioned internal structure is provided with, as is clearly seen in FIGS. 7A, 7B, 8A, and 8B in addition to FIGS. 1 and 2, a vertical hole/outlet port 56 that has a vertical hole continuous with the liquid-phase outlet port 16, and a horizontal hole/outlet port 57 that has a horizontal hole continuous with the upper end of the vertical hole/outlet port 56. The horizontal hole/outlet port 57 is open to the front side of the connection adapter 50, and is adapted to connect to a conduit for guiding a liquid-phase refrigerant to an expansion valve.

Figure 7A:
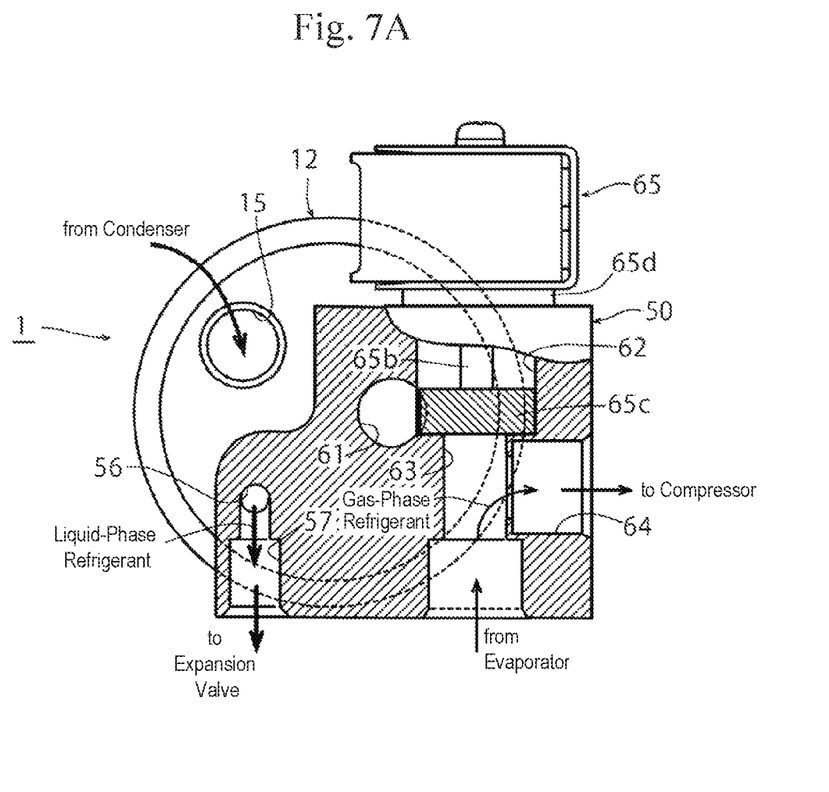
FIG. 7A is a partially cutaway top view illustrating a flow of a refrigerant during the cooling operation of the refrigerant container of the embodiment.
Figure 8A:
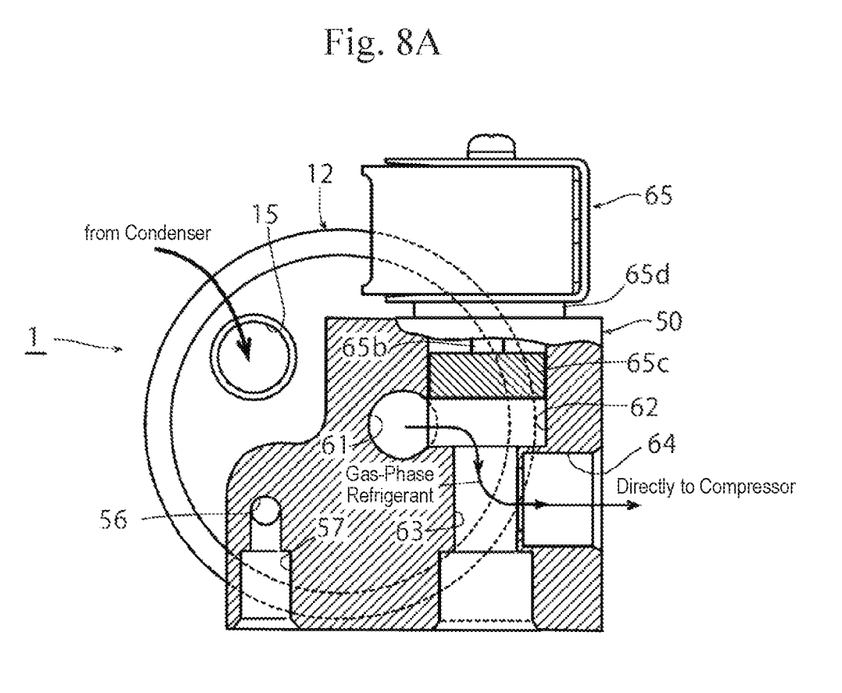
FIG. 8A is a partially cutaway top view illustrating a flow of a refrigerant during the heating operation of the refrigerant container of the embodiment.

Around the center portion in plan view of the connection adapter 50, a vertical hole/outlet port 61 with a relatively large diameter having a vertical hole continuous with the gas-phase outlet port 17, is provided, and a valve-element sliding hole 62 with a relatively large diameter having a horizontal hole that is open on the rear side is provided so that its front-side end overlaps the vertical hole/outlet port 61. A portion of the front-side end of the valve-element sliding hole 62 that overlaps the vertical hole/outlet port 61 is a cutout opening, and the cutout opening allows the vertical hole/outlet port 61 and the valve-element sliding hole 62 to communicate with each other.

On the front side of the connection adapter 50 coaxial with the valve-element sliding hole 62, a gas-phase circulation port 63 having a stepped horizontal hole with a smaller diameter than that of the valve-element sliding hole 62 is provided that has one end side (i.e., the rear side) open to the bottom face (i.e., the front-side face) of the valve-element sliding hole 62, and the other end side open to the front side of the connection adapter 50. The gas-phase circulation port 63 is adapted to connect to a conduit for guiding a gas-phase refrigerant from an evaporator to a suction side of a compressor.

Further, the connection adapter 50 is provided with a horizontal hole/outlet port 64 having a horizontal hole with a relatively large diameter, the horizontal hole/outlet port 64 having one end side open to the gas-phase circulation port 63 and the other end side open to the right-side face. The horizontal hole/outlet port 64 is adapted to connect to a conduit for guiding a gas-phase refrigerant to the suction side of the compressor.

The on-off valve 65 is securely attached on its side to the rear side of the valve-element sliding hole 62 with a cap-like member 65d, which closes the rear-side opening of the valve-element sliding hole 62, sandwiched therebetween. The on-off valve 65 herein is an electromagnetic valve with a well-known structure. Specifically, the on-off valve 65 includes a coil, an attractor, a plunger 65b, a thick, plate-shaped valve element 65c attached to the tip end of the plunger 65b, and a valve-closing spring made of a compression coil spring adapted to urge the plunger 65b in a direction away from the attractor (i.e., the valve-closing direction).

Figure 7B:
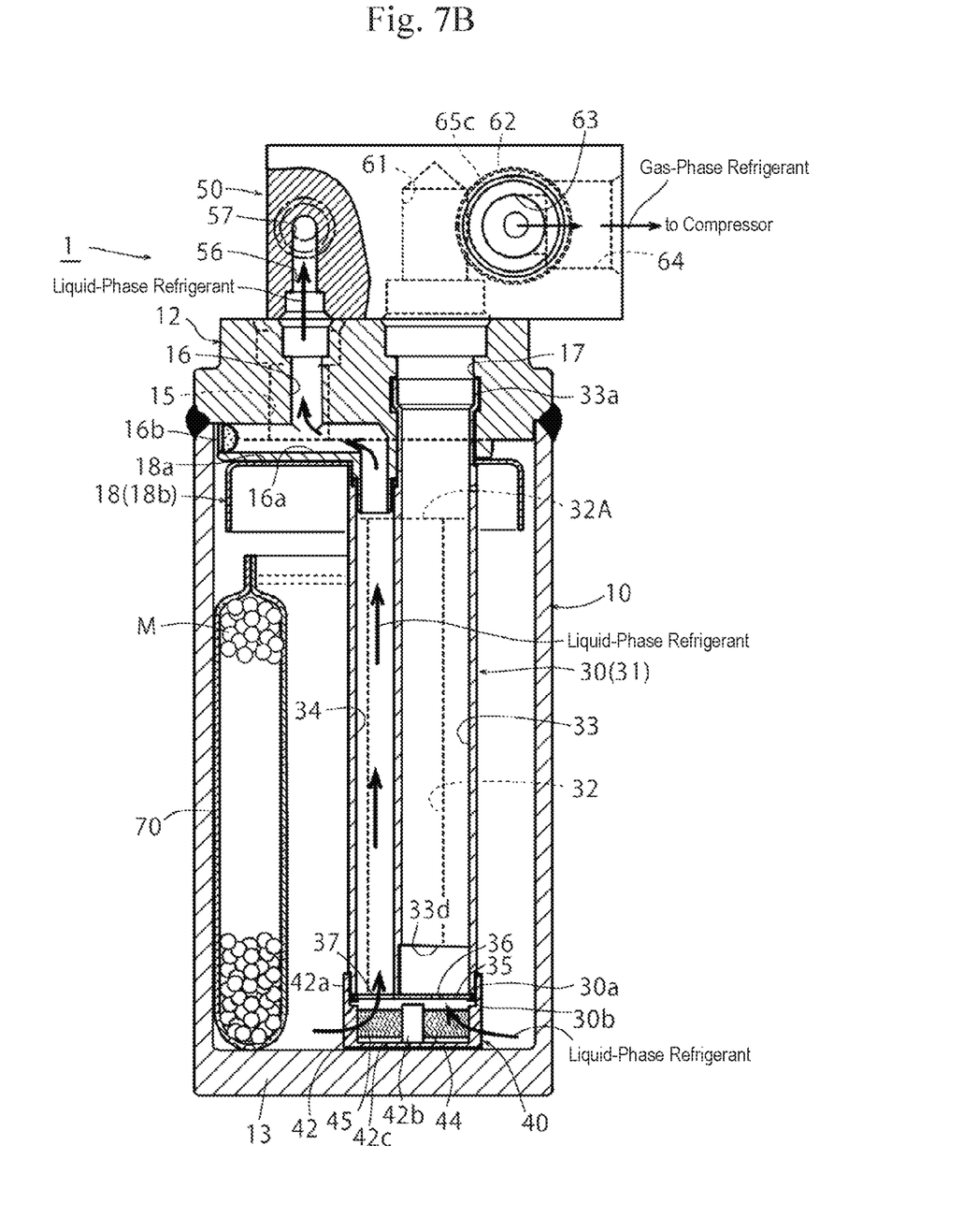
FIG. 7B is a partially cutaway cross-sectional view illustrating a flow of a refrigerant in the cooling operation of the refrigerant container of the embodiment.

The valve element 65c is slidably fit-inserted into the valve-element sliding hole 62, and when the valve is closed (i.e., power is OFF), the valve element 65c is pressed against the bottom face (i.e., the valve seat) of the valve-element sliding hole 62 as illustrated in FIGS. 7A and 7B, thereby closing the opening at one end of the gas-phase circulation port 63, and thus blocking the flow channel for guiding a gas-phase refrigerant from the vertical hole/outlet port 61 to the horizontal hole/outlet port 64 via the valve-element sliding hole 62 and the gas-phase circulation port 63.

Figure 8B:
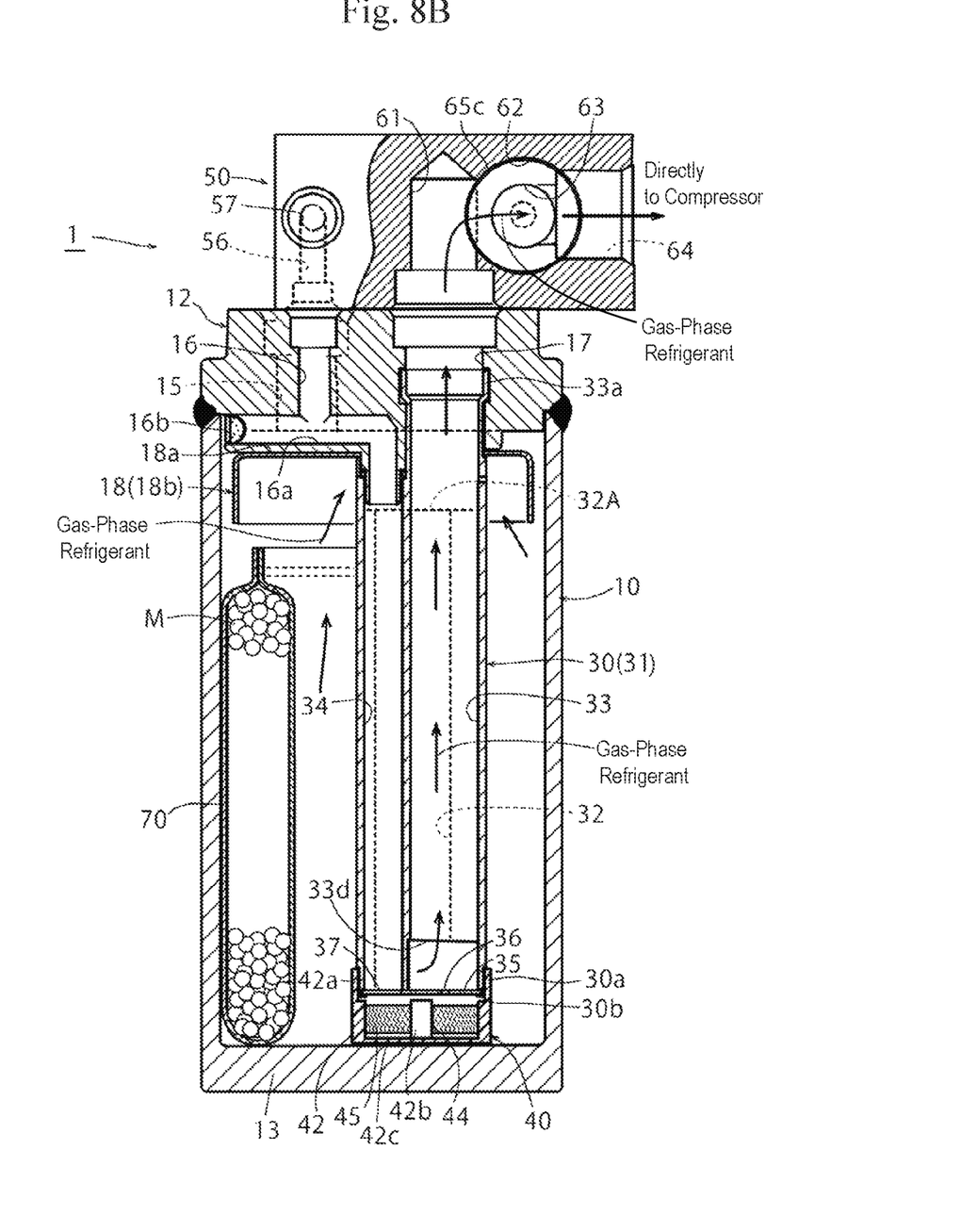
FIG. 8B is a partially cutaway cross-sectional view illustrating a flow of a refrigerant during the heating operation of the refrigerant container of the embodiment.

Meanwhile, when the valve is opened (i.e., power is ON), the valve element 65c moves away from the bottom face (i.e., the valve seat) of the valve-element sliding hole 62 as illustrated in FIGS. 8A and 8B, thereby opening the opening at one end of the gas-phase circulation port 63, so that a gas-phase refrigerant is allowed to flow from the vertical hole/outlet port 61 to the horizontal hole/outlet port 64 via the valve-element sliding hole 62 and the gas-phase circulation port 63.

The operations of the refrigerant container 1 with the aforementioned structure during the cooling operation and the heating operation will be described.

In each of the cooling operation and the heating operation, a refrigerant in a gas-liquid mixed state introduced into the tank 10 from a condenser via the gas/liquid inlet port 15 collides with the gas-liquid separator 18 (or the ceiling portion 18a thereof) and diffuses radially as illustrated in FIG. 3, and thus is separated into a liquid-phase refrigerant and a gas-phase refrigerant. Then, the liquid-phase refrigerant (including oil) flows downward along the inner peripheral surface of the tank 10 and is guided to the lower space of the tank 10, while the gas-phase refrigerant is guided to the upper space of the tank 10.

During the cooling operation, as illustrated in FIGS. 7A and 7B, the on-off valve 65 is closed (i.e., power is OFF) and the opening at one end of the gas-phase circulation port 63 is closed by the valve element 65c. Therefore, the flow channel for guiding the gas-phase refrigerant to the horizontal hole/outlet port 64 via the upper space of the tank 10→the downward-feed flow channel portions 32→the cutout opening 33d→the upward-feed inner pipe portion 33→the gas-phase outlet port 17→the vertical hole/outlet port 61→the valve-element sliding hole 62→the gas-phase circulation port 63 is blocked. Instead, a gas-phase refrigerant from the evaporator is guided to the suction side of the compressor via the gas-phase circulation port 63→the horizontal hole/outlet port 64.

In addition, during the cooling operation, the liquid-phase refrigerant accumulated in the lower space of the tank 10 is guided to the expansion valve via the strainer 40 (or the mesh filter 45 thereof)→the liquid suction port 37 of the base plate 35→the liquid-phase inner pipe portion 34→the liquid-phase outlet port 16→the vertical hole/outlet port 56→the horizontal hole/outlet port 57 due to the pressure difference between the inside of the tank 10 and the expansion valve side.

Therefore, during the cooling operation, the refrigerant container 1 of this embodiment functions as a receiver (i.e., a receiver driver).

In contrast, during the heating operation, as illustrated in FIGS. 8A and 8B, the on-off valve 65 is opened (i.e., power is ON) and the valve element 65c is moved away from the bottom face (i.e., the valve seat) of the valve-element sliding hole 62 so that the opening at one end of the gas-phase circulation port 63 is opened. Therefore, the gas-phase refrigerant separated by the gas-liquid separator 18 is directly suctioned to the suction side of the compressor via the upper space of the tank 10→the downward-feed flow channel portions 32→the cutout opening 33d→the upward-feed inner pipe portion 33→the gas-phase outlet port 17→the vertical hole/outlet port 61→the valve-element sliding hole 62→the gas-phase circulation port 63→the horizontal hole/outlet port 64, and thus is circulated.

During the heating operation, the liquid-phase refrigerant accumulated in the lower space of the tank 10 hardly flows to the expansion valve due to the relationship of the pressure difference.

In addition, oil accumulated in the lower space of the tank 10 together with the liquid-phase refrigerant moves toward the bottom 13 of the tank 10 due to the difference between the oil and the liquid-phase refrigerant in specific gravity, properties, and the like, and is absorbed into the gas-phase refrigerant to be suctioned to the suction side of the compressor via the downward-feed flow channel portions 32→the upward-feed inner pipe portion 33 of the of the gas/liquid outlet pipe 30, and thus is returned to the suction side of the compressor together with the gas-phase refrigerant via the mesh filter 45 of the strainer 40→the oil return hole 36 of the base plate 35→the upward-feed inner pipe portion 33. When the oil passes through the mesh filter 45, foreign matter such as sludge is trapped thereby so that the foreign matter is removed from the circulating refrigerant (including oil).

Therefore, during the heating operation, the refrigerant container 1 of this embodiment functions as an accumulator.

As described above, the refrigerant container 1 of this embodiment has both the functions of a receiver and an accumulator, and the receiver and the accumulator share the tank portion (i.e., the tank 10), the inlet port portion (i.e., the gas/liquid inlet port 15), the gas-liquid separator portion (i.e., the gas-liquid separator 18), the outlet pipe portion (i.e., the gas/liquid outlet pipe 30), and the strainer portion (i.e., strainer 40) in common. Therefore, a rational structure with a small number of components can be provided, and thus, in a heat pump system that adopts the refrigerant container 1, a reduction in the space occupied by the entire system as well as a reduction in the number of components is achieved, so that a reduction in the cost and size can be effectively achieved.

In addition, since the refrigerant container 1 is provided with the on-off valve 65 so as to be able to switch between a state in which the container functions as a receiver and a state in which the container functions as an accumulator in accordance with the operating state of the system based on opening/closing (i.e., ON or OFF) of the on-off valve 65, the pipe lines and the like of the system can be simplified in comparison with when the on-off valve is provided outside of the container.

It should be noted that in the aforementioned embodiment, the flow channel for guiding a gas-phase refrigerant to the gas-phase outlet port 17→the vertical hole/outlet port 61→the valve-element sliding hole 62→the gas-phase circulation port 63→the horizontal hole/outlet port 64 is adapted to be opened or closed by the on-off valve 65. However, additionally, an on-off valve adapted to open or close the flow channel for guiding a liquid-phase refrigerant to the liquid-phase outlet port 16→the vertical hole/outlet port 56→the horizontal hole/outlet port 57 may also be provided so that the on-off valve is opened or closed in an inverse manner to that on the gas-phase refrigerant side. Further, the on-off valves on the gas-phase side and the liquid-phase side may be combined to form a four-way valve.

Furthermore, the refrigerant container 1 need not necessarily be provided with the aforementioned on-off valve or the four-way valve, and such valve may be provided on the outside flow channel, for example, a flow channel connecting the liquid-phase outlet port and the expansion valve, or a flow channel connecting the gas-phase outlet port and the suction side of the compressor.

REFERENCE SIGNS LIST

1 Refrigerant container
10 Tank
12 Cap member
13 Bottom of tank
15 Gas/liquid inlet port
16 Liquid-phase outlet port
17 Gas-phase outlet port
18 Gas-liquid separator
30 Gas/liquid outlet pipe
31 Outer pipe portion
32 Downward-feed flow channel portions
33 Upward-feed inner pipe portion
34 Liquid-phase inner pipe portion
35 Base plate
36 Oil return hole
37 Liquid suction port
40 Strainer
45 Mesh filter
50 Connection adapter
56 Vertical hole/outlet port
57 Horizontal hole/outlet port
61 Vertical hole/outlet port
62 Valve-element sliding hole
63 Gas-phase circulation port
64 Horizontal hole/outlet port
65 On-off valve
65c Valve element
70 Bag
M Desiccants

The invention claimed is:

1. A refrigerant container comprising:
a tank configured to temporarily store a refrigerant;
a gas/liquid inlet port, a liquid-phase outlet port, and a gas-phase outlet port that are provided in an upper portion of the tank;
said the tank having an upper-face opening being hermetically closed by a cap member that includes the gas/liquid inlet port, the liquid-phase outlet port, and the gas-phase outlet port therein;
a gas-liquid separator being disposed below the cap member in the tank, the gas-liquid separator having a shape of a conical hat or an inverted wide bowl and having a smaller diameter than an inside diameter of the tank;
a gas/liquid outlet pipe being disposed between the cap member and a bottom of the tank, the gas/liquid outlet pipe being segmented into a downward-feed flow channel portion, an upward-feed pipe portion, and a liquid-phase pipe portion;
a strainer being provided at a lower end of the gas/liquid outlet pipe;
the downward-feed flow channel portion being open at an upper end of the downward-feed flow channel portion to a lower portion of the gas-liquid separator and being adapted to guide a gas-phase refrigerant in an upper portion of the tank to a portion around the bottom of the tank;
the upward-feed pipe portion protruding upward at an upper portion of the upward-feed flow channel portion beyond the upper end of the downward-feed flow channel portion and being adapted to guide the gas-phase refrigerant from the downward-feed flow channel portion to the gas-phase outlet port; and
the liquid-phase pipe portion being adapted to guide a liquid-phase refrigerant around the bottom of the tank to the liquid-phase outlet port,
wherein:
the refrigerant container is configured to separate the refrigerant introduced through the gas/liquid inlet port into the liquid-phase refrigerant and the gas-phase refrigerant, and is further configured to be switchable between a receiver configuration that guides only the liquid-phase refrigerant after the separation to a side of an expansion valve via the liquid-phase outlet port, and an accumulator configuration that guides the gas-phase refrigerant after the separation to a suction side of a compressor via the gas-phase outlet port together with oil contained in the liquid-phase refrigerant, wherein the refrigerator container further comprising an on-off valve configured to switch the refrigerator container from the receiver configuration to the accumulator configuration by opening and closing a flow channel guiding the gas-phase refrigerant in a portion of the refrigerator container defining the accumulator configuration, and wherein the on-off valve is in an opened position switches the refrigerator container to the accumulator configuration and in a closed position switches the refrigerator container to the receiver configuration.

2. The refrigerant container according to claim 1, wherein the gas-liquid separator is sandwiched between the cap member and the gas/liquid outlet pipe.

3. The refrigerant container according to claim 1, wherein the on-off valve is disposed above the tank.

4. The refrigerant container according to claim 1, wherein the on-off valve is an electromagnetic valve.

5. The refrigerant container according to claim 3, wherein the on-off valve is an electromagnetic valve.

* * * * *